(12) United States Patent
Wangde et al.

(10) Patent No.: US 11,579,945 B2
(45) Date of Patent: Feb. 14, 2023

(54) DYNAMIC SERVICE MESH

(71) Applicant: EMC IP Holding Company LLC, Hopkinton, MA (US)

(72) Inventors: Aman Wangde, Boston, MA (US); Victor Fong, Medford, MA (US); Malini Bhattacharjee, Cupertino, CA (US); Xuebin He, Westwood, MA (US); Kenneth Durazzo, Morgan Hill, CA (US)

(73) Assignee: EMC IP HOLDING COMPANY, Hopkinton, MA (US)

( * ) Notice: Subject to any disclaimer, the term of this patent is extended or adjusted under 35 U.S.C. 154(b) by 0 days.

(21) Appl. No.: 17/199,690

(22) Filed: Mar. 12, 2021

(65) Prior Publication Data

US 2022/0291973 A1 Sep. 15, 2022

(51) Int. Cl.
*G06F 9/54* (2006.01)
(52) U.S. Cl.
CPC .................... *G06F 9/541* (2013.01)
(58) Field of Classification Search
CPC ........................................................ G06F 9/54
USPC ......................................................... 719/310
See application file for complete search history.

(56) References Cited

U.S. PATENT DOCUMENTS

| | | | | |
|---|---|---|---|---|
| 8,327,006 B2 * | 12/2012 | Schroeder, Jr | .......... | H04L 63/08 709/229 |
| 2017/0086203 A1 * | 3/2017 | Chong | .................. | H04W 24/02 |
| 2019/0028552 A1 * | 1/2019 | Johnson, II | ............. | H04L 67/02 |
| 2020/0059360 A1 * | 2/2020 | Martynov | ........... | H04L 63/0807 |
| 2020/0302050 A1 * | 9/2020 | Jain | ......................... | G06F 21/51 |
| 2020/0322273 A1 * | 10/2020 | Natal | .................. | H04L 47/2425 |
| 2021/0019194 A1 * | 1/2021 | Bahl | ....................... | H04L 67/34 |

OTHER PUBLICATIONS

Vindeep Singh, Container-based Microservice Architecture for Cloud Applications. (Year: 2017).*
Ramaswamy Chandramouli, Building Secure Microservices-based Applications Using Service-Mesh Architecture. (Year: 2020).*
Ramaswamy, Building Secure Microservices-based Applications Using Service-Mesh Architecture. (Year: 2020).*
Ramaswamy Chandramouli Zack Butcher, Building Secure Microservices-based Applications Using Service-Mesh Architecture. (Year: 2020).*

* cited by examiner

Primary Examiner — Lechi Truong
(74) Attorney, Agent, or Firm — Workman Nydegger (57) ABSTRACT

One example method includes receiving, from a microservice, a service request that identifies a service needed by the microservice, and an API of an endpoint that provides the service, evaluating the service request to determine whether the service request conforms to a policy, when the service request has been determined to conform with the policy, evaluating the endpoint to determine if endpoint performance meets established guidelines, and when it is determined that the endpoint performance does not meet the established guidelines, identifying an alternative endpoint that meets the established guidelines and that provides the requested service. Next, the method includes transforming the API of the service identified in the service request to an alternative API of the service provided by the alternative endpoint, and sending the service request and the alternative API to the alternative endpoint.

18 Claims, 3 Drawing Sheets

DYNAMIC SERVICE MESH

FIELD OF THE INVENTION

Embodiments of the present invention generally relate to the implementation and use of service meshes. More particularly, at least some embodiments of the invention relate to systems, hardware, software, computer-readable media, and methods for a service mesh that is able to dynamically respond to conditions at various endpoints by selecting an optimal endpoint for use by an application.

BACKGROUND

Many organizations used a containerized approach with respect to their applications. In such an approach, an application may comprise a group of individual services referred to as microservices. The microservices may each be combined together in a respective package, or container, that includes all the elements needed to run the microservice.

At times, the microservices may have a need to interact with, and use, applications and services provided by cloud service providers (CSP) such as Amazon AWS, Google Cloud Platform (GCP), and Microsoft Azure, for example. Each of these CSPs may have a different respective service set, and an organization may use various services of the providers based on criteria such as performance and cost, for example. As well, each of the CSPs may employ different Application Program Interfaces (API) for the respective services offered by that CSP. To illustrate, the implementations of a language translation service, such as from German to English for example, offered by different CSPs may take different respective forms for each CSP. As a result, a developer writing an application may have to spend significant time and effort to configure the application as multi-cloud capable so that the application can effectively interact with each of the different CSP translation services and APIs. Further discussion regarding some examples of problems presented by current approaches is provided below.

One such problem concerns heterogeneous API implementation and vendor lock in. Since each CSP may have a different data plane API for the service provided by that CSP, it becomes difficult for developers to adapt their applications to interact with the service API provided by each CSP. For instance, a translation service is provided by GCP and AWS, but each of those CSPs has its own particular implementation of the translation service. In such a case, a heterogenous API with different respective components for each CSP might serve the purpose of API implementation for multi-cloud providers. As a practical matter however, a heterogenous API would effectively lock the developer in to using a specific CSP, since creating different components of a heterogenous API, so as to extend applicability of the API to the translation services of other CSPs, would require significant effort on the part of the developer.

Another problem with current approaches concerns the fact that it may be difficult to dynamically adjust traffic to accommodate the operations of different CSPs. In particular, the network latency between site where the application is running and the service endpoints, that is, the CSPs, may be different based on internet/network latency. As a result, it may become difficult to track the individual CSP service performance as the traffic to the CSP service may vary depending on the number of users trying to use the services at any given time. Further, the CSP service performance may vary due to amount of that resource that is available for users, and due to the service request volume at the CSP, both of which are beyond the control of application developers and, in any case, may be unknown to developers during development of an application.

A further concern with conventional approaches relates to the difficulty in optimizing complex dependency graphs (DG) that show the relationships between and among microservices in a containerized application environment. Particularly, using multi-cloud services, the optimization of the directed graph may be a significant problem. Correspondingly, it may also become difficult, or impossible, to derive an evaluation order for the microservices, such as for performing troubleshooting of the microservices.

Conventional approaches are also problematic in that they may require excessive computational resources. Particularly, request transformation and service mesh proxy typically require additional resources in computational environments. The architecture of a service mesh may in some cases depend on side car proxy patterns. The sidecar proxy pattern is an application which may operate to abstract certain functions, such as inter-service communications, monitoring and security, away from the main application architecture so that it is easier to track and maintain the performance and operation of application. As well, the side car proxy may perform additional work on the data plane. The memory utilization by the side car proxy may rely on the absolute configuration state the side car proxy holds. As side car proxy operations require a CPU (Central Processing Unit) cycle and memory, the side car proxy may increase the demand on processing and memory resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to the implementation and use of service meshes. More particularly, at least some embodiments of the invention relate to systems, hardware, software, computer-readable media, and methods for a service mesh that is able to dynamically respond to conditions at various endpoints by selecting an optimal endpoint for use by an application.

In general, some example embodiments of the invention may provide a dynamic service mesh which may allow users to add a dynamic behavior to a service programmable proxy by utilizing a developer defined policy engine and transformer in a service mesh control plane. In the policy engine, rules generated by a developer may be applied to evaluate a service provided by the endpoint, that is, provided by an entity such as a CSP for example. A transformer in the policy engine may be used to transform the API if the request for a CSP service made by the container is different from the CSP to which the request will be directed. This approach may allow users to have flexibility in calling the service effectively, so as to thereby improve the performance of the application requesting the service. With the introduction of dynamic service mesh, the resource consumption may be optimized by using SmartNIC and service API invocation by using linear programming approach.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may reduce resource consumption associated with one or more containerized applications. An embodiment may eliminate the need for a developer to have to adapt an application to work with multiple different endpoint APIs, that is, the requirement for a developer to develop multi-cloud applications may be eliminated. An embodiment may enable an optimized matching of an endpoint service with an application that requested an endpoint service. An embodiment may enable ready development of dependency graphs showing the relation between microservices of an application. An embodiment may enable customers to avoid vendor lock-in, while also obtaining improved performance, reliability and reduce cost. An embodiment may enable customers to use the best and most suitable service for their use case without having to spend development effort to switch between different CSPs. An embodiment may enable a strategy of running enterprise workloads on a multi-cloud environment, which may comprise services such as Infrastructure as a Service (IaaS), Platform as a Service (PaaS) or Software as a Service (SaaS), that may provide economic benefits and additional flexibility for managing workloads on the cloud. As a final example, an embodiment may enable the creation of a service marketplace and may provide abstraction for the data plane of service consumptions, which may be useful for both multi-cloud, edge, and 5G use cases.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which large numbers, such as thousands or more, of containerized applications, which may each include multiple microservices, may be optimally directed to services provided by cloud service providers. The connecting of applications with such services, and the use of such services, may be provided on an ongoing, and changing, basis, and may involve transforming APIs on the fly as assessments are made concerning the desirability of using particular CSP services. Such operations are well beyond the mental capabilities of any human to perform practically, or otherwise. Thus, while other, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

A. Aspects of Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, the identification and use of CSP services by containerized applications that may include one or more microservices. Thus, embodiments of the invention may be employed in connection with cloud computing environments, which may or may not be public. Some example cloud computing environments in connection with which embodiments of the invention may be employed include, but are not limited to, Microsoft Azure, Amazon AWS, Dell EMC Cloud Storage Services, and Google Cloud Platform (GCP). More generally however, the scope of the invention is not limited to employment of any particular type or implementation of cloud computing environment.

It is noted that as used herein, 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview

Today, through the use of microservices, various teams can work on different applications independently, thus enabling more rapid deployment of the applications that include the microservices. The use of microservices may also reduce application development time, and increase code reusability. However, in such a microservice ecosystem, there are some challenges relating to service discovery, load balancing, service-to-service and origin-to-service security, and observability and resiliency are deployed using an API gateway. As well, the number of microservices is constantly growing and the microservices may thus become difficult to understand and manage.

In light of such circumstances, so-called service meshes have been developed that may, among other things, enable and authorize service discovery, perform traffic control, provide for security of the microservices. In a service mesh architecture, each microservice may have a sidecar proxy that is external to the microservice. The microservice can interact with external entities and services by way of the sidecar proxy. As well, the parent application that includes the microservice may be connected to the sidecar proxy, which will have the same lifespan and/or lifecycle as the parent application.

A service mesh may have a variety of associated use cases. One such use case is service discovery, in which the service mesh may be used to discover microservices services by providing service-level visibility and telemetry. Another example use case is one in which the service mesh may allow a dynamic ingress and egress traffic control without changing the application that includes the microservice. A final example use case is one which concerns microservice operational reliability. Particularly, metrics collected by the service mesh can be used to check the performance of the microservices such as, for example, how long the microservice takes to complete its operation, and the resource consumption involved in performing that operation.

With continued reference to aspects of an example service mesh, a service mesh control plane may be defined and employed which refers to all functions and processes that determine which path to use to send data, such as a packet or frame, related to an operation performed by a microservice. The service mesh control plan may provide policy and configuration for all the running data planes in the mesh. One example of a service mesh is as the lstio open source service mesh (https://istio.io/latest/) that adds a transparent layer to the microservice environment without changing the code at the microservice level.

As noted earlier, embodiments of the invention may operate in connection with microservice sidecar proxies, or simply 'proxies.' In a service mesh, requests for a particular microservice are routed between the microservices through proxies in their own infrastructure layer. The individual proxies that are used to run the microservices may collectively form a service mesh. The proxies are sometimes referred to as sidecars, such as in the Kubernetes architecture for example, because they run alongside a microservice rather than within a microservice. Sidecars may handle communication between microservices and other services, monitoring of microservice performance, and microservice security related matters. For example, Envoy is one example of a microservice sidecar proxy that may form a transparent communication mesh in which a microservice, and/or the application that includes the microservice, is able to send and receive messages to and from a localhost without having to have an awareness of the network topology. Thus, a microservice sidecar proxy may be thought of as abstracting various services and entities.

Embodiments of the invention may operate in connection with a Container-as-a-Service (CaaS), which refers to a cloud service model that is used to manage and deploy containers, application and cluster of container-based virtualization. This model may help developer and IT departments to develop, run and manage containerized applications. The containers and cluster may be provided as service that can be deployed on-site data centers or cloud. This allows users to stop, start, scale and manage the containers using a web console or API calls. The basic resource may be a container, rather than using a virtual machine (VM). The container orchestration platform may handle container deployment, cluster management, scaling, reporting and lifecycle management. A container orchestration platform may be implemented by providers such as Kubernetes and Docker. For example, a Kubernetes orchestration platform may allow a developer to build application services that span multiple containers, schedule containers across a cluster, scale those containers, and manage their health over time.

Finally, embodiments of the invention may be implemented in connection with cloud providers such as AWS, GCP, and Microsoft Azure, each of which may provide a different respective set of services to a user organization. The user organization may employ various criteria to determine which services will be used, how, when, and for how long. Each service offered by a CSP may have a different respective API.

C. Aspects of Some Example Embodiments

Some example embodiments of the invention may comprise three main components, namely, a service mesh, CaaS, and a vault. The service mesh control plane may be implemented in connection with a policy engine, and an optimization algorithm, which will allow developers and operators to add a dynamic behavior, such as evaluating and transforming APIs for example, to the service mesh control plane. The policy engine may comprise a transformer and evaluator. The evaluator may evaluate the endpoint, that is, the CSP that provides a service that may be needed by one or more microservices, based on rules and criteria defined by a developer and included in the policy engine. A service mesh proxy of the data plane may look at the rules and criteria in the policy engine to see if the rules are satisfied so that a request can be sent to the evaluator to assess an endpoint, that is, a service provided by the endpoint that may be needed by a microservice. The optimization algorithm, which may take the form of linear programming for example, may be used to improve the performance of the policy engine and its components.

Figure 1:
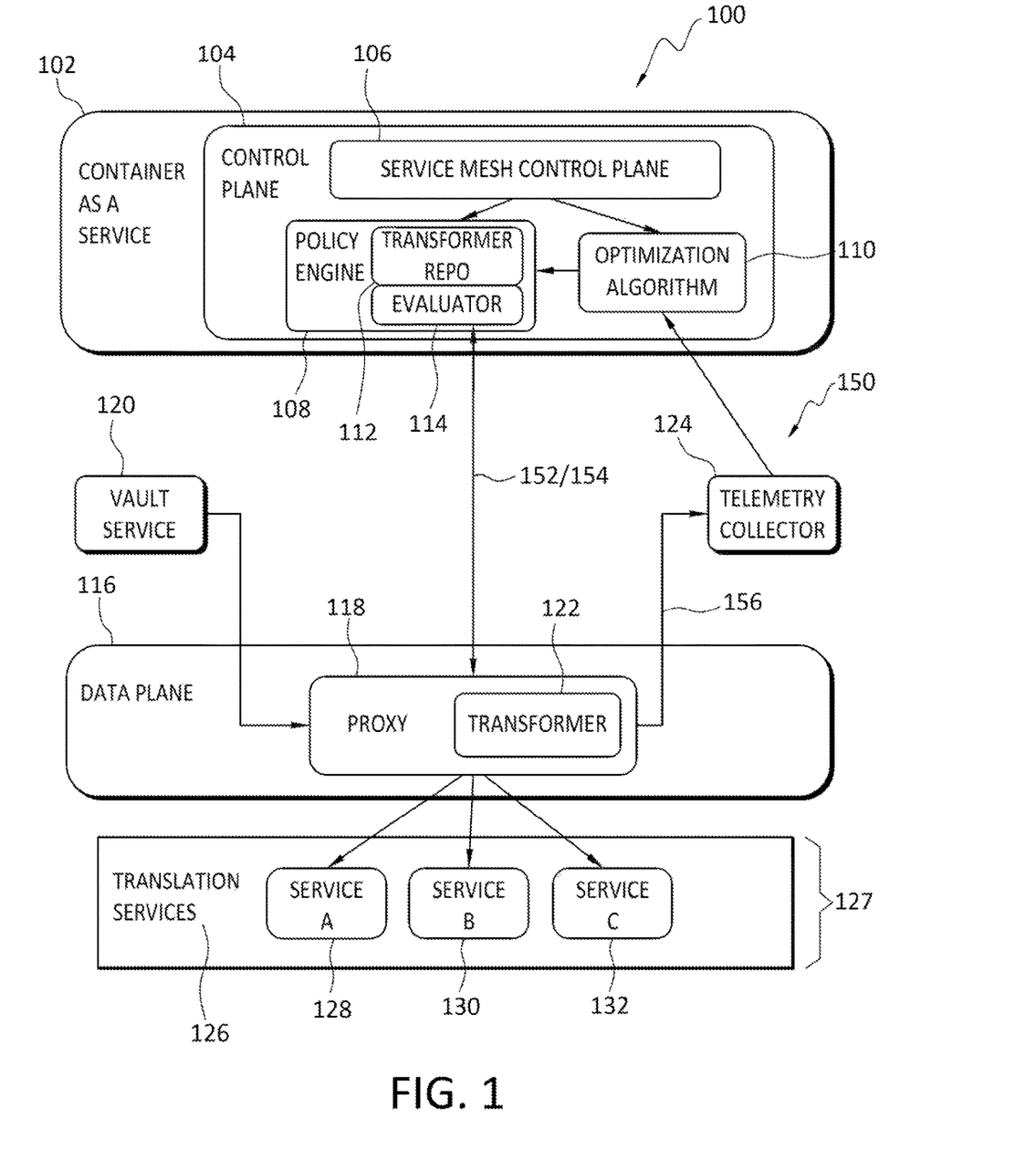
FIG. 1 discloses aspects of an example architecture and method

With reference now to FIG. 1, an example architecture 100 and associated method 150 are discussed in further detail. As shown, a Container as a Service (CaaS) 102 may be provided that includes, or is otherwise associated with, a control plane 104. The control plane 104 may include, or otherwise be associated with, a service mesh control plane 106. The control plane 104 may further include a policy engine 108 and optimization algorithm 110. As discussed in further detail below, the policy engine 108 and optimization algorithm 110 may interact with each other, as well as with the service mesh control plane 106. The example policy engine 108 may include a transformer repo 112 and an evaluator 114.

The example architecture 100 may further comprise a data plane 116 that includes a service mesh proxy 118 that may communicate with a vault service 120 that stores credentials for one or more microservices. These credentials can be obtained from the vault service 120 and configured into the service mesh proxy 118. The service mesh proxy 118 may comprise a transformer 122 that is able to communicate with a telemetry collector 124. The telemetry collector 124 may also communicate with the optimization algorithm 110. Finally, one or more services 126 may be offered by one or more endpoints 127, such as a CSP for example. In the example of FIG. 1, the services 126 may comprise respective translation services 128, 130, and 132, offered by respective CSPs. The scope of the invention is not limited to translation services however, and instead, extends to any services that may be offered by one or more CSPs.

With continued reference to FIG. 1, the CaaS 102 may take the form, for example, of a cloud service that may enable developers or operators to scale, organize, and manage containers using container-based virtualization. Once the container is deployed, the service mesh proxy 118 may be deployed as a respective microservice sidecar proxy alongside each of a plurality of microservices. For example, a platform such as the Envoy platform (https://www.envoyproxy.io/) may be used in this process as a deployable sidecar proxy to a microservice, and such a platform may help to add and remove microservice sidecar proxies dynamically which, in turn, may lend flexibility and responsiveness to the management of a containerized application infrastructure.

The method 150 may begin when a service, such as the CaaS 102 for example, makes a request 152 to a service 126, such as a service provided by a CSP. The request 152 may pass into the data plane 116 and run through the service mesh proxy 118. Depending on the service API and proxy implementation, any of a variety of protocols can be used for the request 152 including, but not limited to, such as HTTP (Hypertext Transfer Protocol), and gRPC (Google Remote Procedure Call). The service mesh proxy 118 may be executed in a host machine, and/or in SmartNIC (Network Interface Controller), depending on the resource availability and configuration. As used herein, SmartNIC refers to an example of a network adapter to which processing tasks can be offloaded to so as to reduce host CPU usage. This offloading of processing tasks may contribute to a more optimal use of the CPU resources since the CPU resources that would otherwise have been dedicated to the processing tasks can now be employed for other tasks instead.

As noted earlier, the policy engine 108 may include the evaluator 114 and transformer repo 112. In some embodiments at least, the selection criteria for a particular service and/or CSP may already defined by a developer and included in the policy engine 108. If the selection criteria are met by the request 152, the evaluator 114 may assess the endpoint, that is, the CSP that provides a service requested 152 by the CaaS. As discussed in more detail below, the optimization algorithm 110 may be used to evaluate the endpoint based on telemetry, and policies and criteria specified by a developer.

With continued reference to FIG. 1, the transformer repo 112 in the policy engine 108 may be used when an API specified in the request 152 sent by the CaaS 102 corresponds to an endpoint that is different from the endpoint to which the request 152 is being, or will be, directed. That is, the request 152, specifically, the portion of the request 152 concerning the API associated with the service specified in the request 152, may be transformed to specify another API depending upon, for example, considerations such as CSP service availability, and the latency associated with a particular CSP and/or CSP service. This process may be referred to herein as API transformation.

Each transformation of an API may be implemented by a small executable defined by a developer and executed within the service mesh proxy 118. For example, CSP such as AWS and GCP may provide respective translation services. Based on endpoint telemetry data that is collected at the service mesh proxy 118, the endpoint API may be transformed, in this example to either GCP or AWS.

After the request has been sent 152 and processed by the service mesh proxy 118, a response may be returned which may be transformed by the transformer 122 within the service mesh proxy 118 and sent back 154 to the caller. In some instances, telemetry information may be collected 156 at each endpoint by the service mesh proxy 118, and the telemetry information used to find unknowns which can be optimized. The telemetry information, which may include information about the performance, availability, and latency, of one or more CSPs and CSP services, may be used by the transformer 122 in determining whether or not an API transformation should be performed. For example, if a CSP service is not available, or the latency in communicating with a CSP service is excessive, that information may be used by the transformer 122 as a basis for transforming an endpoint API. Once any API transformation has been performed, the request with the updated endpoint API may be transmitted 158 to the CSP service that includes that API.

Some embodiments of the invention may allocate a specific amount of service invocation to obtain real-time telemetry based on a developer policy which is included in the policy engine 108. For example, the telemetry collector 124 may invoke GCP once every 5 minutes, even if GCP services are not currently being used, in order to obtain information that may be used for optimization and/or API transformations. Based on one or more policies, which may be defined by a developer, the allocation of the GCP service to requests made by the CaaS 102 may be adjusted by the optimization algorithm 110. In this way, embodiments of the invention may enable the identification of an optimal solution, that is, the particular service 126 that is expected to provide the best performance for the CaaS 102.

D. Further Discussion

With continued reference to the example of FIG. 1, example embodiments may, but are not required to, provide or implement various useful functionalities, examples of which are discussed in further detail hereafter, and which may be implemented, in any combination, in one or more embodiments.

For example, one or more embodiments may implement a service request transformation with programmable service mesh proxy. Particularly, given a pre-defined set of services and plugins using a multi-cloud approach, such embodiments may transform service requests, such as may be issued by one or more microservices and/or applications, to match respective API specifications of different CSPs. To continue with the earlier example of a translation service provided by GCP and AWS, if a service request from a microservice or application specifies the GCP service endpoint, but the GCP service endpoint is unreachable, or not available in a particular region, such embodiments may route that service request, an example of which is the service request 152 for example, to the AWS translation API to provide the needed functionality to the microservice or application that requested the translation functionality. This would avoid vendor lock-in, since the user is not compelled to use CGP and another CSP may be selected if a determination is made that GCP cannot provide the needed functionality. Put another way, embodiments may enable the system to 'shop around' and find the CSP that provides the needed service with the best performance, at least as among the CSPs that might potentially provide the translation service, or other service, to the requesting microservice or application.

In connection with the foregoing, the programmable service mesh proxy 118 may ease the burden on developers and operators by implementing dynamic behavior in the data plane 116. For example, once the request 152 for a service is made by a microservice, an instance of the service mesh proxy 118 may be implemented as a side car proxy dedicated to the requesting microservice so that the microservice can interact with the service, such as a translation service, that was requested. The implementation of the side car proxy may be based on policies and criteria of the policy engine. For example, if the request made by the microservice is consistent with the applicable policy, then the endpoint implicated by the microservice request may be evaluated by the transformer 122 to determine if the endpoint can provide the needed service in an acceptable way. On the other hand, if the request made by the microservice does not match, or is otherwise inconsistent with, the applicable policy, the endpoint evaluation may not be performed. Finally, developers may re-use transformations for the same services, thus possibly reducing the workload of repeatedly adapting to multiple APIs.

Another example of functionality that may be implemented by one or more embodiments concerns multiple-cloud and edge service invocation optimization implemented in a control plane. For example, as there may be multiple services provided by different CSPs, example embodiments may allow the service invocation optimization to be performed at a service mesh control plane, such as the service mesh control plane 106 for example. The optimization of service invocation, by the CaaS 102 or other microservice for example, may be handled using a linear programming approach, or reinforcement learning. To illustrate, there may be multiple different CSPs, each providing a respective translation service. In such a case, the optimization algorithm 110 may be optimized using linear or reinforcement learning approach which may help to call only a service from a single provider, rather than multiple CSPs, based on the endpoint telemetry data gathered by the telemetry collector 124.

A further aspect of some example embodiments concerns collection of unknown telemetry with parallel invocation based on policy. Particularly, embodiments of the invention may use policies of the policy engine as a basis for telemetry data collection concerning one or more CSP services. For example, if a policy of the policy engine specifies a certain maximum acceptable latency, telemetry may be used to obtain latency information concerning services provided by one or more CSPs. The telemetry data, which may be collected in real time and/or may comprise historical data, may be collected and used for dynamic service invocation to multiple different endpoints by percentage. For example, there may be two CSPs, such as AWS and GCP, that provide a service needed by one of the microservices. Based on the telemetry data collected, suppose AWS is determined to have a translation service accuracy rate of 99 percent, and GCP is determined to have a translation service accuracy rate of 1 percent. In this example, the AWS translation service would be called instead of the GCP translation service, due to the superior accuracy of the AWS translation service relative to the accuracy of the GCP translation service. A minimum acceptable translation accuracy level, such as 85 percent for example, may be specified in a policy of a policy engine, such as the policy engine 108 for example, and if a CSP cannot provide the requisite accuracy level, the translation service offered by that CSP may not be invoked or employed. Finally, it is noted that telemetry may be performed on an ongoing basis. For example, invocation of a service, such as the translation service in the preceding example, may be performed on an ongoing basis, such as one CSP service request per minute for example, so as to enable an ongoing assessment of translation service accuracy across multiple CSPs, and thus provide an opportunity for the CaaS or other requestor to switch to a more accurate translation service, if one is identified by the telemetry process.

A final aspect of some example embodiments concerns the ability of example embodiments to offload service mesh proxy and API transformation workloads into smartNIC. That is, some embodiments may be operable to offload the execution of service mesh proxy and API transformation workloads from a server CPU to SmartNIC. This approach may increase application and networking performance, also reducing the resource consumption at the host, that is, the server in this example.

E. Some Example Use Cases

Some embodiments of the invention may help service invocation around multiple Cloud Service Providers (CSP) by using the three components CaaS, Service Mesh Control Plane and Vault Service. Examples of these components are disclosed and discussed elsewhere herein, including at FIG. 1. The following examples disclose how some example embodiments may behave.

The first example use case concerns translation service invocation by a microservice or application. In this illustrative case, translation services may be provided by AWS, GCP and Microsoft AZURE. The policy engine, which may allow programmable proxy behavior using transformation, and evaluator components may be employed in this case. As noted herein, the policies may be defined dynamically. Based on these policies, and metrics acquired as part of a telemetry process, a transformation process may be performed that transforms a microservice service request so that the service request specifies the API provided by the endpoint, or CSP, whose service has been chosen to interact with the microservice that made the service request. In more detail, an evaluator may check the policies to see if the selection criteria for a particular CSP and service are met, that is, whether or not a particular CSP and its service meet specified selection criteria, in a process which may be referred to herein as endpoint evaluation. Further, in the service mesh control plane, the CaaS services may be optimized using a linear programming approach, or reinforcement learning, for example, which may help a model to learn based on historic telemetry collection concerning the translation service, and/or other services, that may be provided by one or more CSPs.

Following are some example optimizations, or at least improvements, and benefits that may be achieved by example embodiments in connection with a translation service, and/or other services, provided by a CSP. One such optimization concerns cost. Particularly, the cost for a service API may be reduced by restricting unnecessary API calls, HTTP headers, and TLS handshakes.

Another example optimization or improvement concerns latency. Particularly, latency may manifest itself in various ways, including as a weak signal, lost signal, and/or complicated routing between a microservice and CSP. Thus, having a service programmable proxy, such as may be provided by some embodiments, may help attenuate the aforementioned problems, and reduce the complexity of routing. As well, if the signal to a service provided by an endpoint CSP, such as GCP for example, indicates that the service is unavailable, the evaluator may then, based on one or more policies, check the available endpoints and transform to a different CSP translation service API, for example, AWS.

Yet another optimization concerns, in the example of a translation service, the accuracy of the translations performed. In this illustrative example, an embodiment may allow the accuracy of the translation services to which various APIs respectively correspond to be predefined in the policy, which will may help enable evaluation of an endpoint based on the accuracy of the translation service provided by that endpoint. B way of illustration, in a multi-cloud environment, translation service accuracy percentages might be as follows: GCP 95; AWS 90; and, Open Source 75.

Embodiments of the invention may also provide optimization or improvements in terms of performance. For example, based on historical data gathered through telemetry, the disclosed optimization algorithm model may learn which will help service invocation proceed more quickly. For example, in a first region, a translation service provided by GCP may have a good response, in terms of latency for example, in the evening but a slower response, maybe 200 ms, in the morning. Thus, it may be better to use a different CSP, such as AWS for example, that can provide a faster service, that is a service with faster response times, in the morning. This switching between CSPs based on performance, and/or other, considerations may be performed automatically in some embodiments. As well, such switching may, or may not, be apparent to a user and/or to the microservice that requested the CSP service.

A final example of possible optimizations and improvements that may be implemented by some embodiments of the invention concerns developer defined SLAs (Service Level Agreements). Particularly, example embodiments may help developers define/modify SLAs effectively, and quickly, using the metrics gathered through telemetry and/or other processes.

F. Example Methods

Figure 2:
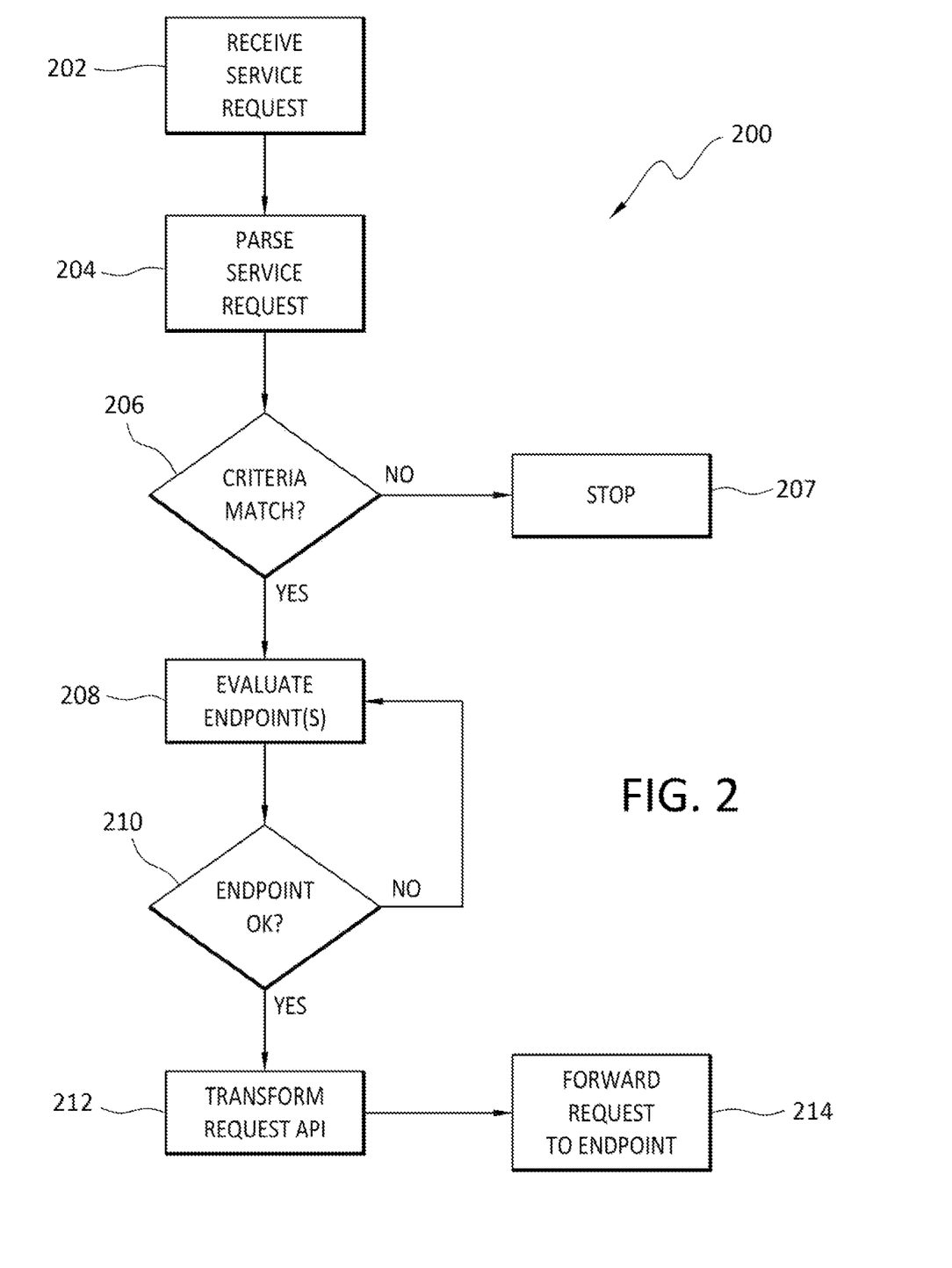
FIG. 2 discloses aspects of another example method.

It is noted with respect to the example method of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, details are provided concerning methods involving the definition and use of a dynamic service mesh, where one example method is denoted generally at 200. In some embodiments, the method 200 may be performed cooperatively by a CaaS and one or more elements of a data plane, although no particular allocation of the disclosed functions among entities is necessarily required.

The method 200 may begin at 202 where a service request is received 202, such as by a service mesh proxy from a control plane of a CaaS. The service request may specify, among other things, the particular service needed, such as a translation service for example, and an API of the CSP that provides the requested service.

At 204, the service mesh proxy, which may take the form of sidecar proxy to the CaaS, may parse the service request to identify the API. Next, the service mesh proxy may then examine any rules and guidelines pertaining to the request to determine 206 if the service request from the CaaS meets applicable criteria. If the criteria are not met, the method 200 may stop 207. On the other hand, if the criteria are met, the service mesh proxy may then request the evaluation 208, by an evaluator, of an endpoint that corresponds to the service request.

If the evaluation 208 of the endpoint reveals that the endpoint is unable to provide the requested service in accordance with applicable rules or policies, then the method 200 may return to 208 where another endpoint is evaluated. This process may be repeated any number of times until an endpoint with acceptable performance is identified.

When the endpoint evaluation 208 reveals that an endpoint other than the one implicated by the initial service request has been determined to provide the best performance, as among those endpoints evaluated, a transformer of the service mesh proxy may transform 212 the initial request API to reflect the API of the endpoint determined to be capable of providing the best service. The request with the transformed API may then be sent 214 to the selected endpoint determined to provide the best service, and the service may then be provided by the selected endpoint to the requestor, the CaaS for example.

E. Further Example Embodiments

Following are some further example embodiments of the invention. These are presented only by way of example and are not intended to limit the scope of the invention in any way.

Embodiment 1. A method, comprising: receiving, from a microservice, a service request that identifies a service needed by the microservice, and an API of an endpoint that provides the service; evaluating the service request to determine whether the service request conforms to a policy; when the service request has been determined to conform with the policy, evaluating the endpoint to determine if endpoint performance meets established guidelines; and when it is determined that the endpoint performance does not meet the established guidelines, identifying an alternative endpoint that meets the established guidelines and that provides the requested service; transforming the API of the service identified in the service request to an alternative API of the service provided by the alternative endpoint; and sending the service request and the alternative API to the alternative endpoint.

Embodiment 2. The method as recited in embodiment 1, wherein the endpoint and the alternative endpoint are different respective cloud service providers.

Embodiment 3. The method as recited in any of embodiments 1-2, wherein the evaluating of the endpoint is determined based in part on metrics obtained by a telemetry process, and the metrics include information about one or more performance characteristics of one or more endpoints.

Embodiment 4. The method as recited in any of embodiments 1-3, wherein evaluating the endpoint includes determining whether or not a latency associated with the endpoint falls within an acceptable range of latencies, and determining whether or not the requested service is available at the endpoint.

Embodiment 5. The method as recited in any of embodiments 1-4, wherein the service request from the microservice is received by a microservice sidecar proxy that is deployed alongside the microservice.

Embodiment 6. The method as recited in any of embodiments 1-5, wherein generation of the service request is performed at a control plane associated with the microservice.

Embodiment 7. The method as recited in any of embodiments 1-6, further comprising collecting respective telemetry data from the endpoint and from the alternative endpoint, and the telemetry data is used in the evaluating of the endpoint.

Embodiment 8. The method as recited in any of embodiments 1-7, further comprising offloading the transforming of the API from a server CPU to a smartNIC.

Embodiment 9. The method as recited in any of embodiments 1-8, wherein an optimization algorithm operates to ensure that the service identified in the service request is called by the microservice from only a single endpoint.

Embodiment 10. The method as recited in any of embodiments 1-9, wherein after the service request is issued by the microservice, the following processes are performed automatically without any further action on the part of the microservice: evaluating the service request; evaluating the endpoint; identifying the alternative endpoint; and, transforming the API.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
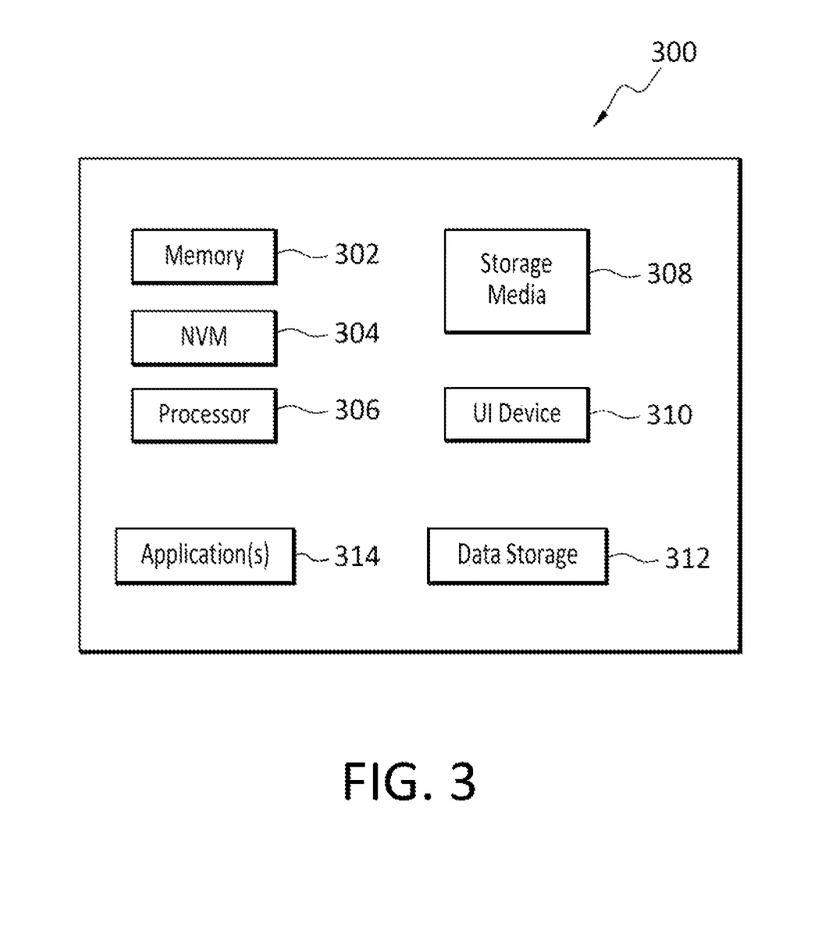
FIG. 3 discloses aspects of a computing entity configured to perform any of the disclosed methods and processes.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising: receiving, from a microservice, a service request that identifies a service needed by the microservice, and an API of an endpoint that provides the service, and the service request is received by a service mesh proxy from a control plane of a CaaS, wherein the service mesh proxy resides in a data plane accessible by the control plane of the CaaS; evaluating, by an evaluator of a policy engine, the service request to determine whether the service request conforms to a policy, wherein the policy is dynamically defined and acts as a basis for telemetry data collection; when the service request has been determined to conform with the policy, evaluating, by the evaluator, the endpoint to determine if endpoint performance by the endpoint meets established guidelines; and when it is determined that the endpoint performance does not meet the established guidelines, identifying an alternative endpoint whose performance meets the established guidelines and that provides the requested service; transforming, by a transformer of the service mesh proxy, the API of the service identified in the service request to an alternative API of the service provided by the alternative endpoint; and sending the service request and the alternative API to the alternative endpoint;

wherein the endpoint and the alternative endpoint are different respective cloud service providers.

2. The method as recited in claim 1, wherein the evaluating of the endpoint is determined based in part on metrics obtained by a telemetry process, and the metrics include information about one or more performance characteristics of one or more endpoints.

3. The method as recited in claim 1, wherein evaluating the endpoint includes determining whether or not a latency associated with the endpoint falls within an acceptable range of latencies, and determining whether or not the requested service is available at the endpoint.

4. The method as recited in claim 1, wherein the service mesh proxy is operable to communicate with a vault service that stores credentials for the microservice.

5. The method as recited in claim 1, wherein generation of the service request is performed at the control plane of the CaaS.

6. The method as recited in claim 1, further comprising collecting, by a telemetry collector, respective telemetry data from the endpoint and from the alternative endpoint, and the telemetry data is used in the evaluating of the endpoint, and the telemetry collector is operable to communicate with the service mesh proxy and with an optimization algorithm of the control plane of the CaaS.

7. The method as recited in claim 1, further comprising offloading the transforming of the API from a server CPU to a smartNIC.

8. The method as recited in claim 1, wherein an optimization algorithm of the control plane of the CaaS operates to ensure that the service identified in the service request called by the microservice from only a single endpoint.

9. The method as recited in claim 1, wherein after the service request is issued by the microservice, the following processes are performed automatically without any further action by the microservice: evaluating the service request; evaluating the endpoint; identifying the alternative endpoint; and, transforming the API.

10. A non-transitory computer readable storage medium having stored therein instructions that are executable by one or more hardware processors to perform operations comprising: receiving, from a microservice, a service request that identifies a service needed by the microservice, and an API of an endpoint that provides the service, and the service request is received by a service mesh proxy from a control plane of a CaaS, wherein the service mesh proxy resides in a data plane accessible by the control plane of the CaaS; evaluating, by an evaluator of a policy engine, the service request to determine whether the service request conforms to a policy, wherein the policy is dynamically defined and acts as a basis for telemetry data collection; when the service request has been determined to conform with the policy, evaluating, by the evaluator, the endpoint to determine if endpoint performance by the endpoint meets established guidelines; and when it is determined that the endpoint performance does not meet the established guidelines, identifying an alternative endpoint whose performance meets the established guidelines and that provides the requested service; transforming, by a transformer of the service mesh proxy, the API of the service identified in the service request to an alternative API of the service provided by the alternative endpoint; and sending the service request and the alternative API to the alternative endpoint;

the endpoint and the alternative endpoint are different respective cloud service providers.

11. The non-transitory computer readable storage medium as recited in claim 10, wherein the evaluating of the endpoint is determined based in part on metrics obtained by a telemetry process, and the metrics include information about one or more performance characteristics of one or more endpoints.

12. The non-transitory computer readable storage medium as recited in claim 10, wherein evaluating the endpoint includes determining whether or not a latency associated with the endpoint falls within an acceptable range of latencies, and determining whether or not the requested service is available at the endpoint.

13. The non-transitory computer readable storage medium as recited in claim 10, wherein the service mesh proxy is operable to communicate with a vault service that stores credentials for the microservice.

14. The non-transitory computer readable storage medium as recited in claim 10, wherein generation of the service request is performed at the control plane of the CaaS.

15. The non-transitory computer readable storage medium as recited in claim 10, wherein the operations further comprise collecting, by a telemetry collector, respective telemetry data from the endpoint and from the alternative endpoint, and the telemetry data is used in the evaluating of the endpoint, and the telemetry collector is operable to communicate with the service mesh proxy and with an optimization algorithm of the control plane of the CaaS.

16. The non-transitory computer readable storage medium as recited in claim 10, wherein the operations further comprise offloading the transforming of the API from a server CPU to a smartNIC.

17. The non-transitory computer readable storage medium as recited in claim 10, wherein an optimization algorithm of the control plane of the CaaS operates to ensure that the service identified in the service request is called by the microservice from Responsive to OA mailed 9Jun 22 only a single endpoint.

18. The non-transitory computer readable storage medium as recited in claim 10, wherein after the service request is issued by the microservice, the following processes are performed automatically without any further action by the microservice: evaluating the service request; evaluating the endpoint; identifying the alternative endpoint; and, transforming the API.

* * * * *